W. J. BELCHER.
DRIVE CHAIN CONSTRUCTION.
APPLICATION FILED DEC. 16, 1909.
958,466.
Patented May 17, 1910.
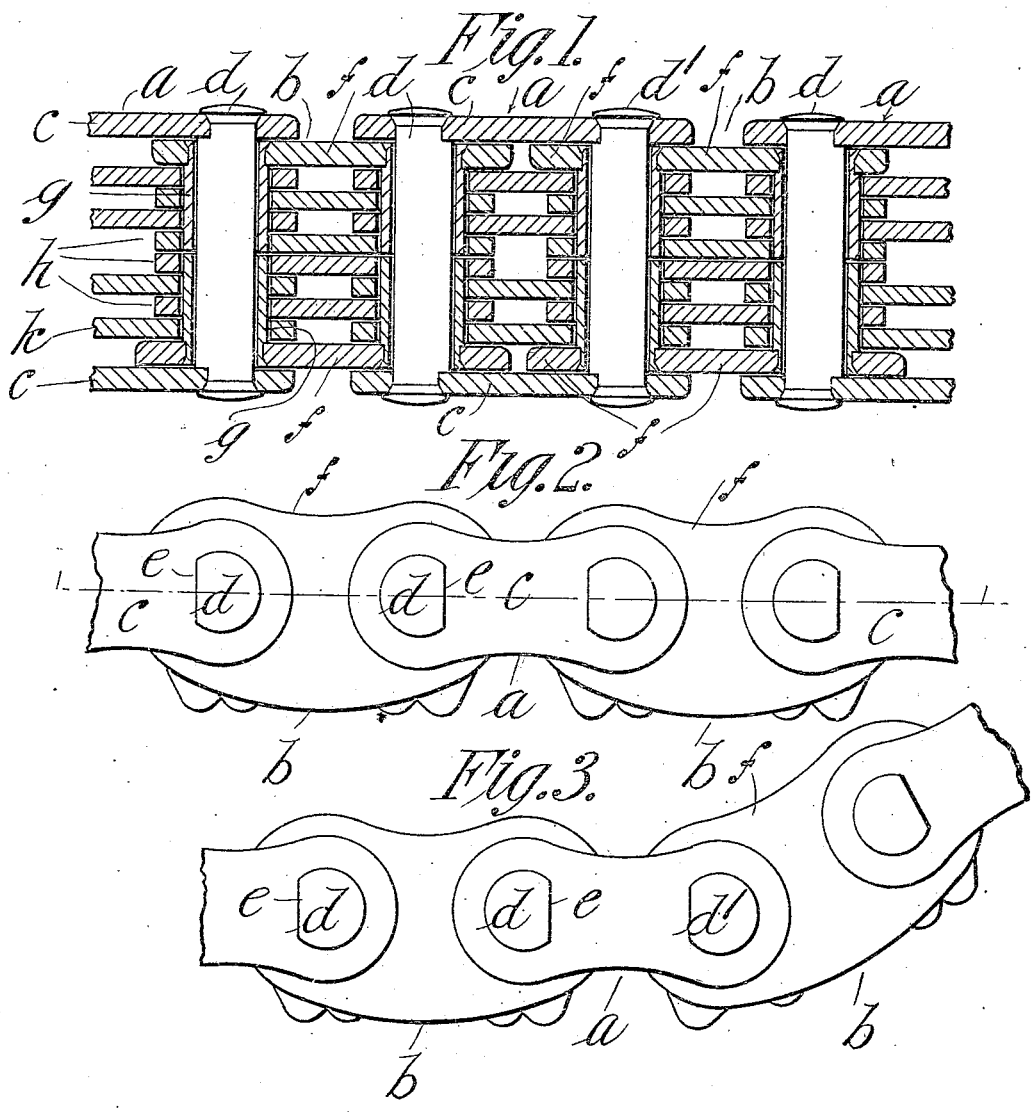

UNITED STATES PATENT OFFICE.

WARREN J. BELCHER, OF HARTFORD, CONNECTICUT, ASSIGNOR TO THE WHITNEY MANUFACTURING COMPANY, OF HARTFORD, CONNECTICUT, A CORPORATION OF CONNECTICUT.

DRIVE-CHAIN CONSTRUCTION.

958,466.  Specification of Letters Patent.  Patented May 17, 1910.

Applicatoin filed December 16, 1909. Serial No. 533,422.

*To all whom it may concern:*

Be it known that I, WARREN J. BELCHER, a citizen of the United States of America, residing at Hartford, in the county of Hartford and State of Connecticut, have invented new and useful Improvements in Drive-Chain Construction, of which the following is a specification.

This invention relates to drive-chains, the object being to provide a chain in which the area of those bearing surfaces most subject to wear may be made as extensive as possible to the end that when in use the elongation of the chain which is practically all due to wear, if the parts be properly proportioned, may be reduced as much as possible.

The drawings illustrate a chain in whose construction is embodied the objects above referred to.

Figure 1 being a longitudinal section of the chain taken in the plane of line 1—1, Fig. 2. Fig. 2 is a side elevation of a portion of a chain showing link elements extended in a straight line. Fig. 3 is the same view of the chain as shown in Fig. 2 but with certain of the link elements shown in a straight line and other elements deflected from said line.

The chain is made up of pivotally united link elements,—one of which is indicated as a whole by $a$ and the other by $b$. The link characterized by the letter $a$ as a whole comprises the plates $c$ parallel with each other and oppositely disposed on either side of the chain, and the pivot-pins $d$ each of which is non-rotatably secured in the plates $c$ near the ends thereof, this non-rotatable connection being attained by flattening one side of that portion of the ends of the pins that enter the plates, as shown at $e$ Figs. 2, 3, and 4. The second link $b$ comprises the oppositely disposed side-plates $f$ in which, near the ends thereof, are secured the bushings $g$, the internal diameters of which are such as to provide a good sliding fit for the pins $d$. Fitted over these bushings $g$ are the link members, certain of which, as $h$ Fig. 1, extend in one direction to a bushing of the same link element $b$, and certain others of which, as $k$, extend in the opposite direction to, and are fitted over, one of the bushings $g$ of an adjacent link element $b$. The disposition of these link members is such as to theoretically distribute the strain, to which the chain may be subjected, equally among the various parts constituting the two links above described.

To illustrate the distribution of the wear between the members constituting the two main link portions $a$ and $b$, of the chain, let it be assumed that the chain is in the position shown in Fig. 2, and that the link $a$ be held in that position and the link $b$ (pivotally united to one end thereof) be swung on its axis, as shown in Fig. 3, to deflect it out of a straight line; the parts which move when the link $b$ is so deflected being the two side plates $f$ of said link and the bushing $g$ which is secured in said plates $f$. Which one of the two bushings $g$ in the side plates will be rotated about one of the pins $d$ will depend of course upon which end of the link $b$ is rotated on one of the pins $d$ as its axis. In the position of the parts as shown in Fig. 3, the bushing which is so rotated is that one through which the pin marked $d^1$ in Fig. 3 extends. As this link $b$ is deflected from a straight line, the link members $h$ which extend between the above referred to pin $d^1$ and the pin $d$ next to the right will swing with the bushing $g$ on the pin $d^1$, and the bushing will also have a rotative movement relative to those link members $k$ which extend thereto from that pin $d$ next to the left of the pin $d^1$. Hence, the only frictional contact which could result in wear between the surfaces of the chain members and which therefore, could result in the elongation of the chain, is the contact between the interior of the bushing $g$ and the exterior surface of the pin $d^1$ coincidently with at least an equal degree of wear between the bearing surfaces between the link members $k$ carried on the bushing $g$, through which said pin $d^1$ extends. In other words, if the wear is between the pin and bushing alone no elongation of the chain can occur, and inversely if the wear should be between the exterior of the bushings and the link members carried thereby, no elongation of the chain could occur.

The extension of the area of the bearing surfaces provided by the construction described and shown herein therefore will necessarily result in a chain whose life will be much longer before appreciable elongation begins, than one whose bearing surfaces are less extensive.

From the preceding description, it is therefore apparent that none of the links h which are coextensive, or practically so, with the side-plates f of the links b, have any rotative effect at all on the bushings g, and yet these links withstand the same longitudinal strain as the links k which have a rotative bearing on the exterior of the bushings: In other words, only one-half of these link members are subject to wear when only one link is moved relative to the one with which it is pivotally connected. It should be borne in mind, however, that while these link members h and k constitute the greater part of the chain, there can be no elongation of the chain as a whole unless wear takes place between the pin and the bushing, which would allow a movement in the direction of the length of the chain of one of the links a relative to one of the links b, and by dividing the wearing strain between the exterior surface of the pins d and the interior surface of the bushings g, and between the exterior surfaces of the bushings g and one-half of the link members the chain is capable of a much longer service before showing any elongation than when made in the usual manner. Of course, there would be more or less wear between the adjacent overlapping ends of the link members g and h and between the overlapping ends of the plates c and f, but such wear could not result in any elongation of the chain.

What I claim, is—

1. A drive-chain consisting of links comprising oppositely disposed side-plates and non-rotatable pins extending through said plates near the ends thereof, and other links comprising oppositely disposed side-plates and non-rotatable bushings extending through the plates near the ends thereof, a pin of one of said links extending through a bushing of the other link to constitute a chain; together with link members movably fitted over the bushings, certain of said members extending from one bushing to another in the same link, and certain other link members extending to a bushing of another link.

2. A drive-chain consisting of links comprising oppositely disposed side-plates and non-rotatable pins extending through the side-plates near the ends thereof, and other links comprising oppositely disposed side-plates and non-rotatable bushings extending through the plates near the ends thereof, a pin of one of said links extending through a bushing of the other link to constitute a chain; together with link members fitted over said bushings, certain of said link members being rotatable on the bushings, and certain other members being non-rotatable on the bushings.

WARREN J. BELCHER.

Witnesses:
K. I. CLEMONS,
HARRY W. BOWEN.